INVENTOR
K. M. CLIPSHAM
PER

ATTORNEY

United States Patent Office 2,804,694
Patented Sept. 3, 1957

2,804,694

OVENS AND HEAT TREATING APPARATUS

Kenneth Macpherson Clipsham, Toronto, Ontario, Canada, assignor to Canada Wire and Cable Company Limited, Toronto, Ontario, Canada, a corporation Application February 9, 1954, Serial No. 409,089

Claims priority, application Canada December 4, 1953

22 Claims. (Cl. 34—86)

This invention relates to circulating baking or drying ovens, including down draft wire enamelling ovens, wherein air or other gas is introduced into the baking compartment and, together with the fumes etc. which result from the baking or drying process, is removed for disposal or partial recirculation, and the invention relates particularly to ovens having openings or slots at each end to permit lines of wire or other material to pass through the oven continuously to be baked or dried. The invention also relates to methods of heat treating, particularly for drying enamelled wire. The present application is a continuation-in-part of my original U. S. patent application, Serial No. 324,010, filed December 4, 1952, now abandoned.

More particularly the invention relates to means and methods for controlling or preventing the movement of air and/or fumes through such openings or slots in order to prevent the admission of unwanted air and the escape of fumes and to promote recirculation when desired. The invention also provides for the inclusion of a catalyst bed so that catalytic combustion of fumes may be performed easily and to advantage. The invention is particularly suited though not necessarily restricted to vertical wire enamelling ovens and for clarity and simplicity of discussion, the following specification and drawings describe and illustrate down draft wire enamelling ovens.

A conventional down draft wire enamelling oven has a vertically arranged baking compartment through which wire travels in an upward direction and preheated air flows downwardly. A vertical heater compartment alongside the baking compartment contains suitable heaters for preheating the air, the air moving from the heater compartment into the baking compartment at the top where it comes into contact with wire leaving the oven and completes the baking of this wire. As the hot air is drawn down through the baking compartment the bake is accomplished gradually and the temperature drops somewhat due to absorption of heat by the wire, to the evaporation of thinners, etc. A favourable heat pattern is thus developed which can be influenced by simple variations in the arrangement of heaters, in the arrangement of heat insulation in the oven, and in the rate of circulation. To ensure evenness of bake around the wire and across the oven, turbulence is promoted by suitable baffles.

Ovens of this type for handling the larger sizes of wire are often built back to back with the two baking compartments in the centre. Operation of the ovens is independent although a common source of blown air may be used. This arrangement requires less insulation on the wall away from the heat source than if the ovens are built separately. The invention hereafter described is applicable to any such arrangement of ovens or to single ovens.

To evacuate enamel fumes which are mainly generated in the lower half of the oven, and to maintain the downward flow of hot air in the baking compartment against the natural chimney effect of the oven requires substantial suction at the bottom of the oven. In accordance with conventional practice this suction is set to exactly equalize the pressures inside and outside the oven across the top slot through which the wires leave the oven, so that there is no tendency for fumes to escape from or for air to enter the oven at that point. Once set the oven gives close control of baking even when the heaters for the air are electrically operated in a Y-delta or on-off system.

With conventional ovens the bottom slot, through which the wires enter the baking compartment, raises important difficulties. Here a pressure difference (suction) across the slot, dependent on the height of the oven and the baking temperature, causes cold air to enter and mix with the fumes in the lower part of the oven. The amount of air pulled in varies with the width of the slot but even with the narrowest slot with which it is practical to operate and avoid touching of the freshly coated wires, this leakage in of cold air causes serious cooling of the gases at the bottom of the oven, thus producing a less effective heat pattern and causing condensation of the high boiling solvent vapors and fumes given off by modern wire enamels. The condensate may drip from the oven or run into the slot opening and get on the wires: if the slot is opened wider to avoid this, more cold air enters and condensation is increased. The use of a heat exchanger on the air supply helps reduce the cooling effect of this air when it first enters the heater compartment and the heat pattern can be adjusted in other ways, but the main danger of condensate getting on the wire remains. It is a main object of the invention to overcome the leakage of cool air through the bottom slot of a down draft wire enamelling oven and thus to improve the heat pattern and minimize condensation of fumes.

The fumes generated in an enamel oven are hot, and while a heat exchanger is useful in recovering part of their heat a greater recovery is possible if the fumes can be recirculated through the oven. If, however, the raw fumes are mixed in sufficient volume with the fresh air being delivered to the oven there is danger that an explosive mixture will be built up. It is a further object of the invention to make possible the safe recirculation of enamel fumes.

It has been proposed heretofore to burn the fumes of an enamel oven in the presence of a catalyst to render the fumes innocuous, but due to excessive leakage of air at the bottom slot of conventional down draft ovens the fumes are so cooled that it would be difficult to maintain the fumes at a temperature which is high enough for their combustion in the presence of a catalyst. According to the invention, the leakage in of cool air can be overcome and catalytic combustion of enamel fumes can therefore be performed. It is a further object of the invention to utilize the catalytic combustion of fumes to recover heat from the fumes in a down draft wire enamelling oven.

Other objects and advantages of the invention will appear from the following description of three embodiments of the invention. In the drawings which illustrate the invention:

Figure 1:
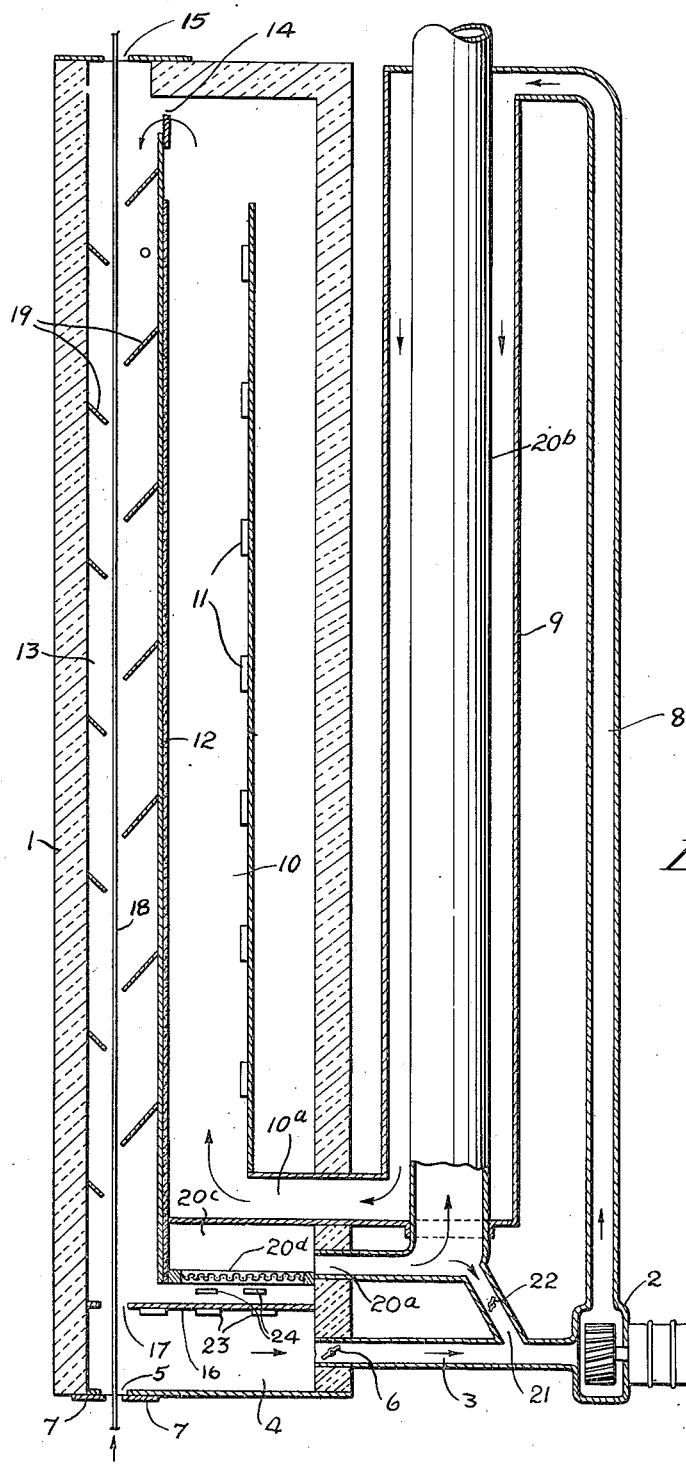
Figure 1 is a diagrammatic sectional view of a down draft wire enamelling oven constructed according to the invention.
Figure 2:
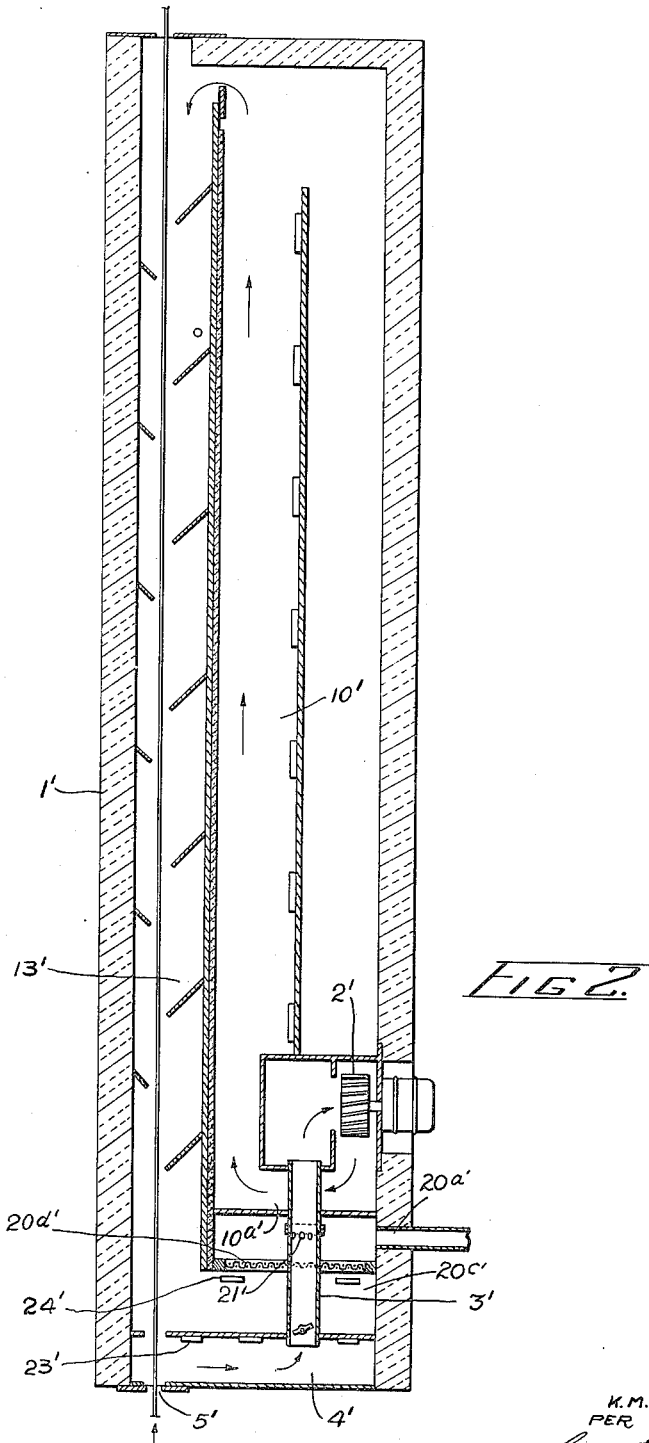
Figure 2 is a diagrammatic sectional view of another form of down draft wire enamelling oven constructed according to the invention.
Figure 3:
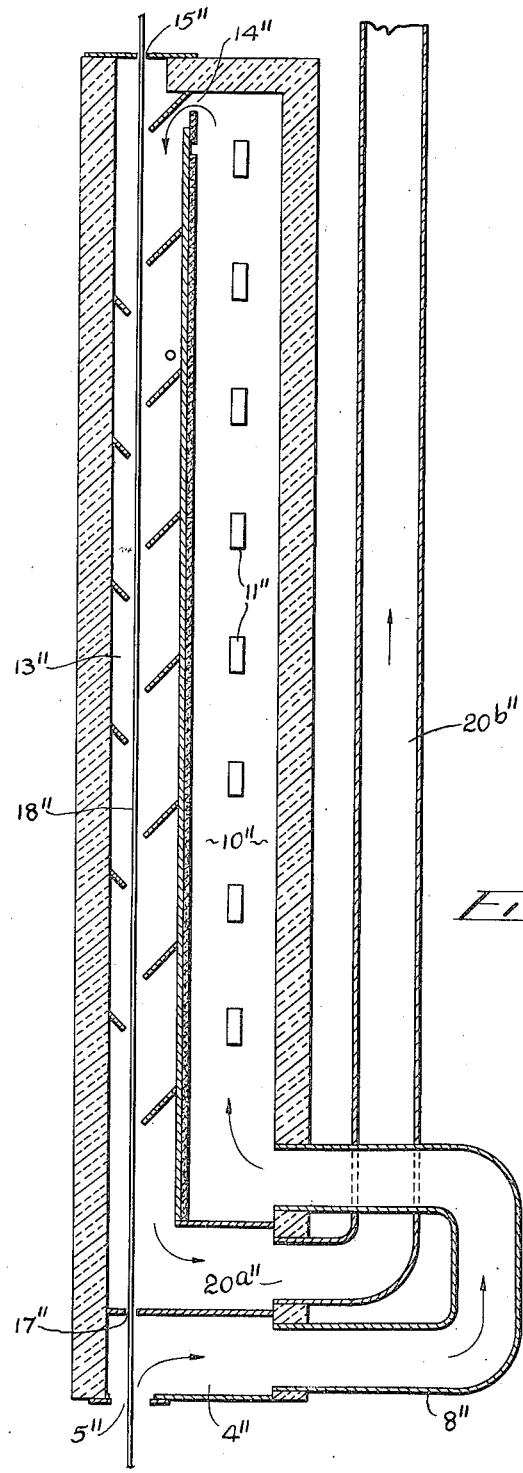
Figure 3 is a diagrammatic sectional view of yet another form of the invention.

Figures 1 and 2 were included in my original application Serial Number 324,010; Figure 3 has been added in the present application.

Referring first to Figure 1, the down draft wire enamelling oven illustrated consists of a tower 1 through which air is circulated by a fan or blower 2. The blower 2 has an inlet passage 3 communicating with the outlet of a compartment 4 (hereinafter called the inlet compartment) in the lower end of the tower 1. The blower 2 draws air through a slot 5 in the bottom of the inlet compartment 4, and thence through the compartment 4 and the inlet passage 3. The flow of air to the blower can be regulated by a damper 6. Slidable plates 7 are provided adjacent the slot 5 to vary its width and thus the pressure in the inlet compartment.

Air drawn into the inlet passage 3 is forced by the blower 2 through a pipe 8 to a heat exchanger 9 and thence into the lower end 10a of an air heating compartment 10 in the tower 1. Within the air heating compartment is a plurality of heaters 11 which warm the air as it rises to the upper end of the compartment. The air heating compartment 10 has a common insulated wall 12 with a baking or treating compartment 13, with an adjustable inlet opening 14 through which air heated in the compartment 10 is admitted to the upper end of the baking compartment 13. The opening 14 is an adjustable slot which is set at the proper width to give a slight pressure, and the width of the slot may be varied from side to side of the oven to balance heat across the oven. The passages 3, 8, 9, the compartment 10, and the inlet opening 14 form the intake for the treating compartment 13 from the inlet compartment 4.

The baking compartment 13 has an adjustable slot 15 at its upper end, and at its lower end has a common wall 16 with the inlet compartment 4. In the wall 16 is another slot 17 which is aligned in a vertical direction with the slots 5 and 15 so that a wire 18, coated with enamel, can be drawn through the slot 5, the compartment 4, the slot 17, the baking compartment 13 where the enamel is baked, and out the exit slot 15 at the top of the tower. Hot air entering the opening 14 passes down the baking compartment 13 to an exhaust, the air being swirled by baffles 19 and picking up enamel fumes as the enamel is baked.

The exhaust from the baking compartment is distinct from the opening 17 and consists of an outlet 20a, exhaust flue 20b, and the portion 20c of the baking compartment adjacent the outlet 20a. The exhaust suction is just sufficient to counteract the chimney effect in the baking compartment 13 and have zero pressure differential across the slot 15. A bed 20d is provided in the exhaust and contains a catalyst such as platinum. The air and fumes from the baking compartment pass through the catalyst bed 20d, and in the presence of the catalyst the fumes burn, assisting the heating of air in the compartment 10 which, as previously described, is in the air intake of the baking compartment 13. Part of the hot air and fumes is recirculated from the catalyst bed 20d through the oven by means of a recirculation inlet passage 21 to the blower 2. The amount of recirculation from the exhaust to the intake is controlled by a damper 22.

Heaters 23 mounted on the wall 16 warm the air passing into the inlet passage 3 and maintain the wall 16 at a temperature which will avoid condensation of fumes on it. Additional heaters 24 in the exhaust portion 20c of the baking compartment adjacent the wall 16 maintain the fumes from the baking compartment 13 sufficiently warm for catalytic combustion at the bed 20d.

The slot 17 corresponds to the conventional bottom slot of a down draft oven. Since the pressure inside the baking compartment adjacent the slot 17 is less than atmospheric (e. g. —0.10 inch of water) cool air would normally flow into the baking compartment from outside the tower 1 through the slot 17. However, the blower 2 is set to maintain constant air flow through the inlet compartment 4, and the pressure within the compartment 4 is adjusted by means of the plates 7 to match the pressure in the baking compartment 13 so that there is generally little or no pressure differential across the slot 17 and therefore litle or no flow of air or fumes through this slot. It is a feature of the invention, however, that by proper selection of relative widths for slots 17 and 5 air can be admitted or fumes withdrawn through slot 17, and in either case with both slots wider than the bottom slot could be in a conventional down draft oven. Slot 17 can be wider than slot 5 and is set at such a width (at least one inch) that there is no danger of the wires rubbing against the wall 16 or aginst the plates 7, and the pressure within the compartment 4 is controlled by varying the width of the slot 5 by means of the plates 7. Thus, the blower 2 and slot 15 are set in the ususal way to obtain proper air flow and heating, and the pressure in the inlet compartment 4 is thereafter regulated by controlling the ratio of widths between the slots 5 and 17 with constant air flow. Drawing the main air supply through the inlet compartment 4 gives a large flow of air through the slot 5, and the slots 5 and 17 may be much larger than the bottom slot of conventional ovens. Accidental rubbing of the wire 18 is thus avoided, condensation is avoided, and yet the accurate control which is an important feature of a separately heated down draft oven is retained. The inventor provides means for recirculation and thereby effective use of catalytic combustion.

Without catalytic combustion (i. e. when the catalyst bed 20d is not used) it is found that the best operation is achieved with a pressure (say —0.09 inch of water) in the compartment 4 such that some air enters the oven through the slot 17: this provides control of the heat pattern in the bottom of the oven and prevents the mixing of fumes and air in proportions which may be explosive. However, recirculation of the hot enamel fumes can be obtained by increasing the suction in the compartment 4 to a point where fumes are drawn out of the baking compartment through the slot 17. On account of the danger of reaching the lower explosive limit in the oven (at which the amount of fumes present is sufficient to form an explosive mixture with air) the percentage of unburnt recirculated fumes should be kept low.

With catalytic combustion there is an advantage in some direct recirculation of fumes through the slot 17 since this tends to avoid cooling of plate 16 and thus assists in attaining the temperature necessary to initiate catalytic combustion at the bed 20d. Recirculation of burnt fumes from the bed 20d takes place through the passage 21.

It will be noted that the main air supply, passing through the slot 5, the inlet compartment 4 and the inlet passage 3, is the medium by which pressure balance across the slot 17 is maintained. While the oven is warming up, a certain amount of automatic recirculation of air or fumes occurs through the slot 17; balance of pressure across the slot 17 is reached when the oven reaches its normal temperature and the full chimney effect exits in the compartment 13.

In the embodiment of the invention shown in Figure 2 a tower 1' has within it a blower 2' communicating through an inlet passage 3' with an air inlet compartment 4' and drawing a supply of fresh air through a wire admitting opening 5'. The blower delivers air to the lower end 10a' of a heating compartment 10', and the air passes into a baking compartment 13' where it is drawn downwardly to an exhaust outlet 20a', passing on the way through a catalyst bed 20d' (if used). Thus this embodiment is similar to that shown in Figure 1, except that the blower 2' is located within the tower 1' and the inlet passage 3' is located in the exhaust portion 20c' of the baking compartment 13' and passes through the catalyst bed 20d'. Heat exchange occurs through the walls of the inlet passage 3' and the bottom of heater compartment 10a' and is particularly effective when the catalyst bed is working. Recirculation occurs through adjustable inlet openings 21' in the passage 3', and heaters 23' and 24' warm the common wall of the inlet and baking compartments, and the fumes passing to the catalyst bed.

Figure 3 shows the invention applied to an oven that does not have a circulating blower or fan, and that consequently does not have a heat exchanger or a recirculation passage. Air enters a slot 5″ into an inlet compartment 4″ and thence passes through a passage 8″ into a heating compartment 10″ having electric heaters 11″. From the heating compartment the heated air passes through a slot 14″ into the top of a baking compartment 13″, and down the baking compartment through an outlet 20a″ to a flue 20b″. Wire 18″ to be treated passes upwardly through the slot 5″ in the inlet compartment and through entrance and exit slots 17″ and 15″ respectively in the baking compartment. A useful measure of reduced air leakage through the slot 17″ is obtainable if the circulation passages are large and the slots 15″ and 17″ are kept as small as possible, the width of slot 5″ being adjusted to best advantage.

It is to be understood that the forms of the invention herewith shown and described are to be taken as preferred examples of the same and various changes in the shape, size and arrangement of parts may be resorted to without departing from the spirit of the invention or the scope of the subjoined claims.

What I claim as my invention is:

1. A down draft oven having a compartment for treating material, the compartment having a first opening adjacent the bottom for the continuous reception of material passing upwardly in the compartment for treatment, means for providing a downward flow of gas through the treating compartment counter to the direction of movement of said material, said means including an intake to the treating compartment for passage of gas into the treating compartment adjacent the top and an exhaust from the treating compartment for passage of gas out of the treating compartment adjacent the bottom, the intake and the exhaust being distinct from the first opening, an inlet compartment in communication with the treating compartment through the first opening and having another opening through which said material passes into the inlet compartment and thence through the first opening into the treating compartment, the intake of the treating compartment connecting the treating compartment to the inlet compartment whereby gas passing into the treating compartment through the intake first passes through the inlet compartment.

2. A down draft oven as claimed in claim 1, in which the means for providing flow of gas includes an exhaust flue in the exhaust of the treating compartment.

3. A down draft oven as claimed in claim 1, in which the means for providing flow of gas includes a fan in the intake of the treating compartment.

4. A down draft oven as claimed in claim 1, in which said other opening serves as an inlet for gas passing through the inlet compartment, the size of said other opening being adjustable.

5. A down draft oven having a compartment for treating material, the compartment having a first opening adjacent the bottom for the continuous reception of material passing upwardly in the compartment for treatment, the compartment also having an inlet for passage of gas into the treating compartment adjacent the top and an outlet for passage of gas out of the treating compartment adjacent the bottom, the inlet and the outlet being distinct from the first opening, an inlet compartment in communication with the treating compartment through the first opening and having another opening through which said material passes into the inlet compartment and thence through the first opening into the treating compartment, the inlet compartment being connected to the treating compartment through the inlet of the treating compartment, and means for providing a flow of gas into said other opening, thence through the inlet compartment to the inlet of the treating compartment, and thence downwardly through the treating compartment to the outlet of the treating compartment.

6. A down draft oven as claimed in claim 5, including means for varying the ratio of the size of said other opening to the size of the first opening.

7. An oven having a compartment for treating material, the treating compartment having an intake for gas and an exhaust for combustible products of the oven, an inlet compartment adjacent the exhaust of the treating compartment and in communication therewith through a first opening, the inlet compartment having another opening through which material to be treated passes into the inlet compartment and thence through the first opening into the treating compartment, a fan in the intake of the treating compartment for supplying gas to the treating compartment, the fan having an inlet in communication with the inlet compartment, a catalyst bed in the exhaust of the treating compartment for burning the combustible products, and a recirculation passage between the catalyst bed and the inlet of the fan for recirculating the burnt products through the treating compartment.

8. An oven having a compartment for treating material, the treating compartment having an intake for air and an exhaust for combustible products of the oven, an inlet compartment having a common wall with the exhaust of the treating compartment and in communication therewith through an opening in the common wall, the inlet compartment having another opening through which the material to be treated passes into the inlet compartment and thence through the opening in the common wall into the treating compartment, a fan in the intake of the treating compartment for supplying air to the treating compartment, the fan having an inlet in communication with the inlet compartment for drawing air through the said other opening into the inlet compartment and thence into the fan, a catalyst bed in the exhaust of the treating compartment for burning the combustible products, a recirculation passage between the catalyst bed and the inlet of the fan for recirculating the burnt products through the treating compartment, and heating means adapted to warm the common wall and the combustible products in the exhaust of the treating compartment.

9. An oven having a compartment for treating material, the treating compartment having an intake for air and an exhaust for combustible products of the oven, an inlet compartment in communication with the exhaust through a first opening, the inlet compartment having another opening through which the material to be treated passes into the inlet compartment and thence through the first opening into the treating compartment, a fan in the intake of the treating compartment for supplying air to the treating compartment, the fan having an inlet passage passing through the exhaust of the treating compartment to the inlet compartment for drawing air through the said other opening and obtaining a pressure in the inlet compartment adjacent the first opening substantially equal to the pressure in the treating compartment adjacent the first opening, a catalyst bed in the exhaust of the treating compartment adjacent said inlet passage for burning the combustible products and warming the air in said inlet passage, and a recirculation passage from the catalyst bed to said inlet passage for recirculating burnt products through the treating compartment.

10. A down draft oven as claimed in claim 1, in which the treating compartment and the inlet compartment have a common wall in which the first opening is provided, and heating means are located adjacent the common wall.

11. A down draft oven as claimed in claim 1, in which the means for providing a downward flow of gas through the treating compartment includes a fan in the intake of the treating compartment, the fan having a recirculation inlet from the exhaust of the treating compartment.

12. A down draft oven as claimed in claim 1, in which a catalyst bed is provided in the exhaust of the treating compartment for burning combustible products of the oven.

13. A down draft oven as claimed in claim 12, in which the means for providing a downward flow of gas through the treating compartment includes a fan in the intake of the treating compartment, and the fan has a recirculation inlet from the catalyst bed for recirculation of the burnt products through the treating compartment.

14. A down draft oven as claimed in claim 1, in which the pressure in the treating compartment adjacent the first opening is less than atmospheric and means are provided for controlling the pressure differential between the inlet compartment and the treating compartment across the first opening.

15. A down draft oven as claimed in claim 14, in which the means for controlling the pressure differential comprise means for adjusting the ratio of the sizes of the first and second openings.

16. An oven having a compartment for treating material and an opening to the treating compartment for passage of the material, means for providing a flow of gas through the treating compartment, said means including an intake to and an exhaust from the treating compartment for passage of gas into and out of the treating compartment respectively, said means also including a fan in the intake, the intake and the exhaust being distinct from the opening, an inlet compartment in communication with the treating compartment through the opening, the intake of the treating compartment connecting the treating compartment to the inlet compartment whereby gas passing into the treating compartment through the intake first passes through the inlet compartment, and a catalyst bed in the exhaust of the treating compartment for burning combustible products of the oven, the fan having a recircuation inlet from the catalyst bed for recirculation of the burnt products through the treating compartment.

17. A vertical wire enamelling oven having a treating compartment for drying enamelled wire, the compartment having a first opening at the bottom for continuous reception of wire passing upwardly in the compartment for drying and an exit opening at the top for continuous discharge of the wire, circulating means for providing a flow of gas through the treating compartment and for maintaining a pressure less than atmospheric in the compartment adjacent the first opening, the circulating means including an intake to the treating compartment, a fan in the intake, and an exhaust to atmosphere from the treating compartment for passage of gas into and out of the treating compartment respectively, the intake and the exhaust being distinct from each other and from the first opening, and means for preventing unwanted leakage of air into the treating compartment through the first opening due to the low pressure in the treating compartment adjacent the first opening as well as for preventing unwanted leakage of gas from the treating compartment through the first opening, said preventing means including an inlet compartment in communication with the treating compartment through the first opening, the inlet compartment having a second opening to atmosphere for continuous passage of the wire into the inlet compartment and thence through the first opening to the treating compartment, the inlet compartment also having an outlet distinct from said openings and from said exhaust of the treating compartment, said preventing means also including means for maintaining the pressure in the inlet compartment adjacent the first opening at less than atmospheric, thus controlling the pressure differential between the inlet compartment and the treating compartment across the first opening, the pressure maintaining means including as the main air supply for the oven, a connection of the intake of the treating compartment with said outlet of the inlet compartment whereby the circulating means causes air to flow from outside the oven through the second opening and the inlet compartment to the intake and thence to the treating compartment, the pressure maintaining means also including means for varying the ratio of the sizes of the first and second openings, all said openings being sufficiently large for the wire to pass through them without rubbing.

18. An oven as claimed in claim 17, in which the intake to the treating compartment opens into the treating compartment at the top and the exhaust from the treating compartment is from the bottom whereby the flow of gas through the treating compartment is counter to the direction of movement of the wire.

19. A down draft oven having a compartment for treating material, the compartment having a first opening adjacent the bottom for the continuous reception of material passing upwardly in the compartment for treatment, circulating means for providing a flow of gas down the treating compartment and for maintaining a pressure less than atmospheric in the compartment adjacent the first opening, the circulating means including an intake to the treating compartment for passage of gas into the treating compartment adjacent the top and an exhaust from the treating compartment for passage of gas out of the treating compartment adjacent the bottom, the intake and the exhaust being distinct from the first opening, means for preventing unwanted leakage of air into the treating compartment through the first opening due to the low pressure in the treating compartment adjacent the first opening, said preventing means including an inlet compartment in communication with the treating compartment through the first opening, the inlet compartment having a second opening for passage of the material into the inlet compartment and thence through the first opening into the treating compartment, the inlet compartment also having an outlet distinct from said openings and from said exhaust of the treating compartment, said preventing means also including means for maintaining the pressure in the inlet compartment adjacent the first opening at less than atmospheric thus controlling the pressure differential between the inlet compartment and the treating compartment across the first opening, the pressure maintaining means including means for providing a flow of air from outside the oven through the second opening into the inlet compartment and thence out the outlet of the inlet compartment, and a catalyst bed in the exhaust of the treating compartment for burning combustible products of the oven.

20. A down draft oven as claimed in claim 19, in which the intake of the treating compartment includes a gas passage through which gas passes to the treating compartment, the catalyst bed being located adjacent said passage for heating the gas in the gas passage.

21. An oven as claimed in claim 17, in which a catalyst bed is provided in the exhaust of the treating compartment for burning combustible products of the oven.

22. An oven as claimed in claim 21, in which the intake of the treating compartment includes a gas passage through which gas passes to the treating compartment, the catalyst bed being located adjacent said passage for heating the gas in the gas passage.

References Cited in the file of this patent

UNITED STATES PATENTS

| | | |
|---|---|---|
| 1,004,251 | Gustave | Sept. 26, 1911 |
| 1,722,797 | Jessup | July 30, 1929 |
| 2,119,261 | Andrews | May 31, 1938 |
| 2,268,988 | Hess et al. | Jan. 6, 1942 |
| 2,384,990 | French | Sept. 18, 1945 |
| 2,443,443 | Chavannes | June 15, 1948 |
| 2,517,024 | Prescott et al. | Aug. 1, 1950 |
| 2,658,742 | Suter et al. | Nov. 10, 1953 |